Figure 5:
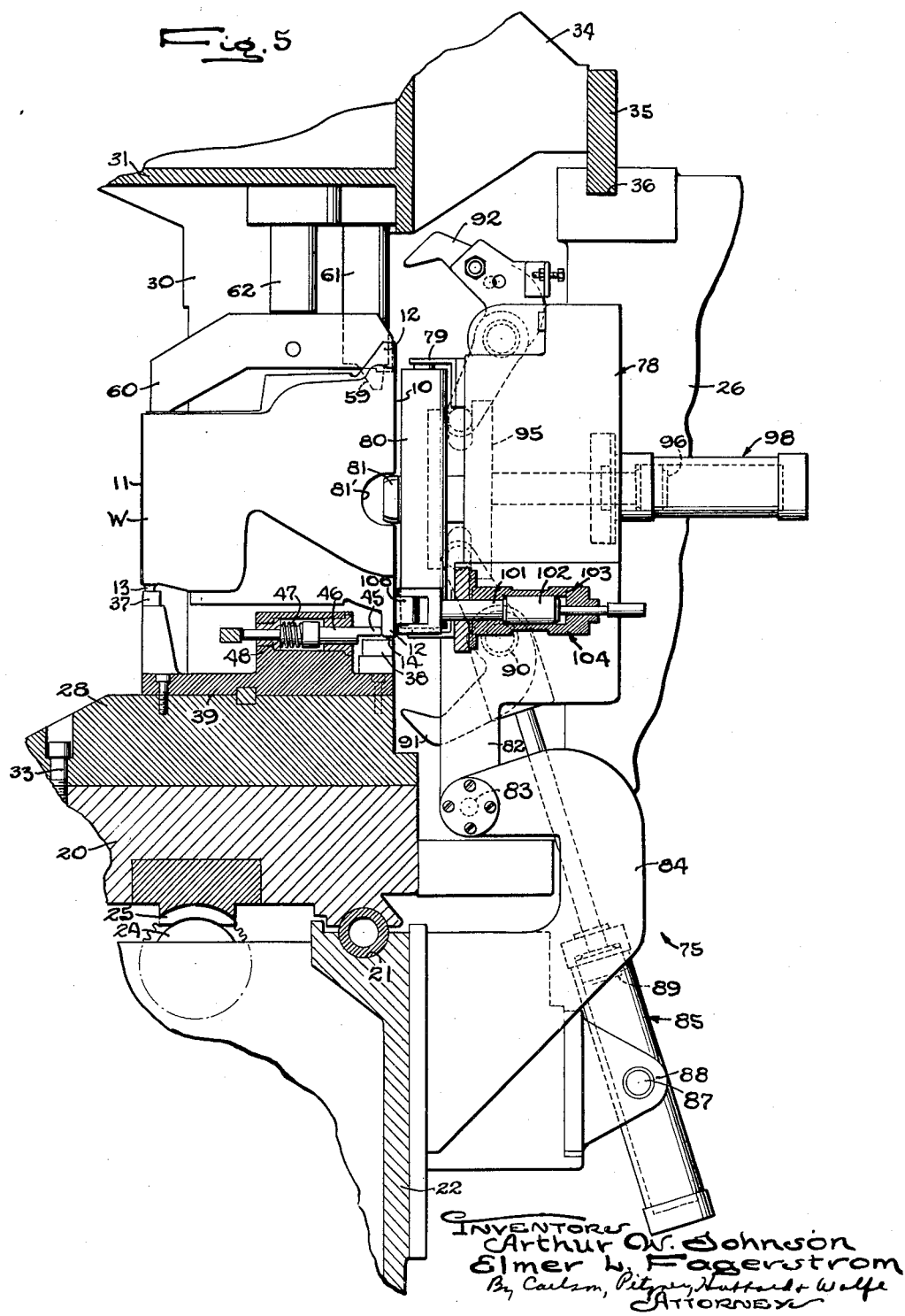

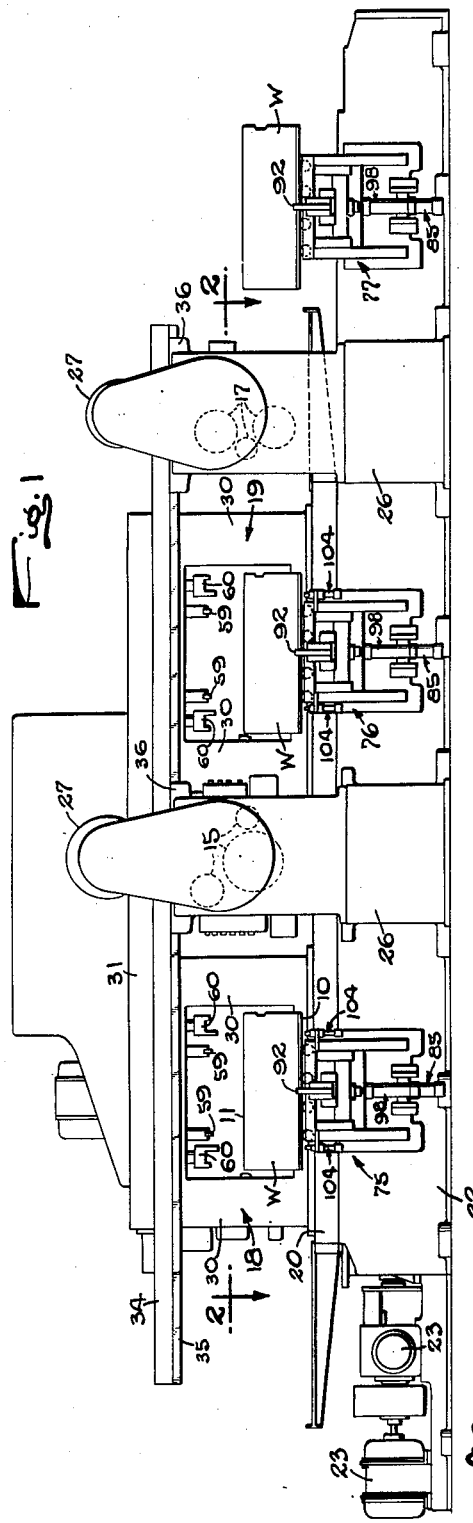

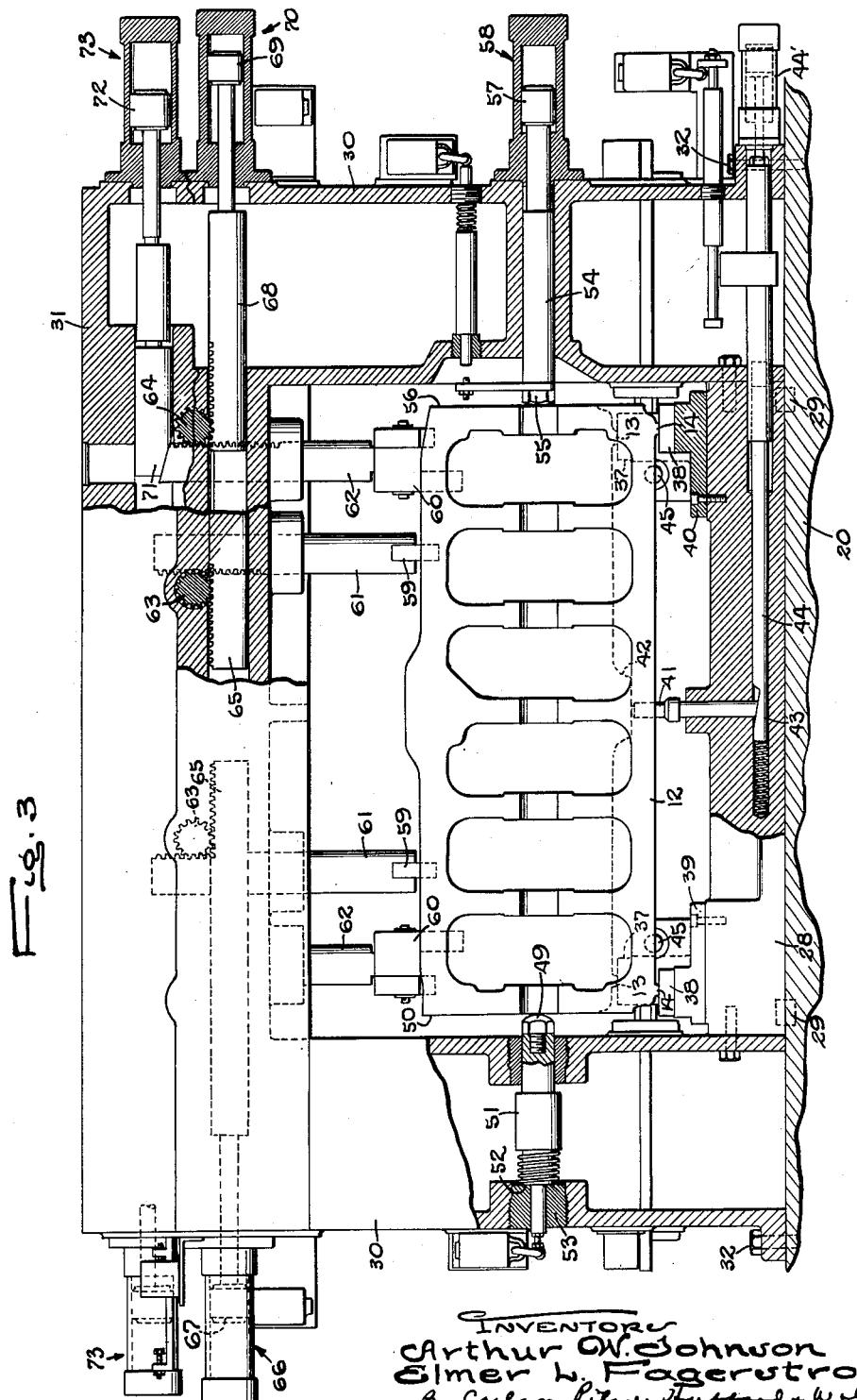

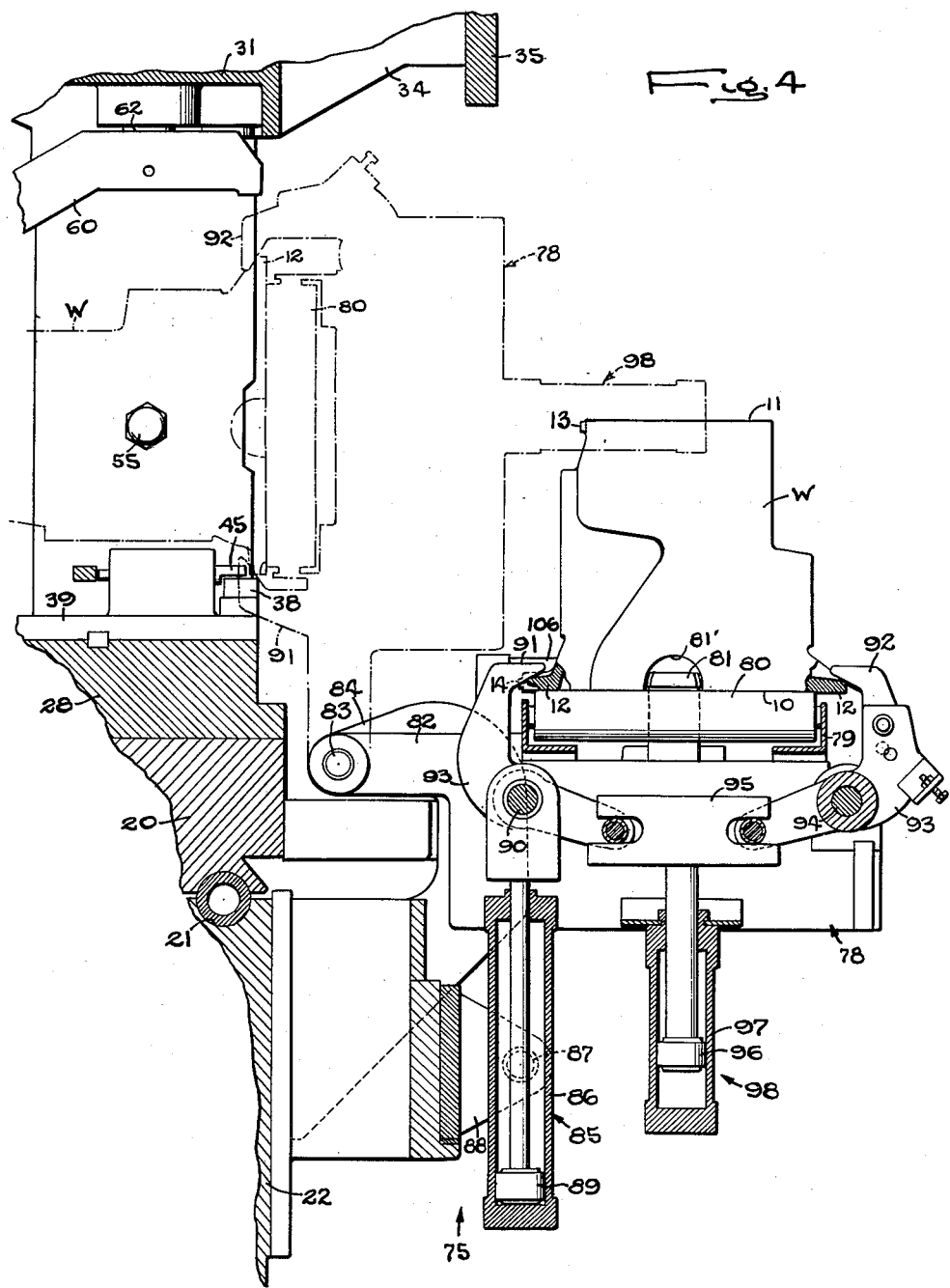

Dec. 11, 1951 A. W. JOHNSON ET AL 2,577,766
MULTIPLE STATION MACHINE TOOL
Filed Dec. 7, 1949 5 Sheets-Sheet 4

INVENTORS
Arthur W. Johnson
Elmer L. Fagerstrom
By Carlson, Pitzner, Hubbard & Wolfe
ATTORNEYS

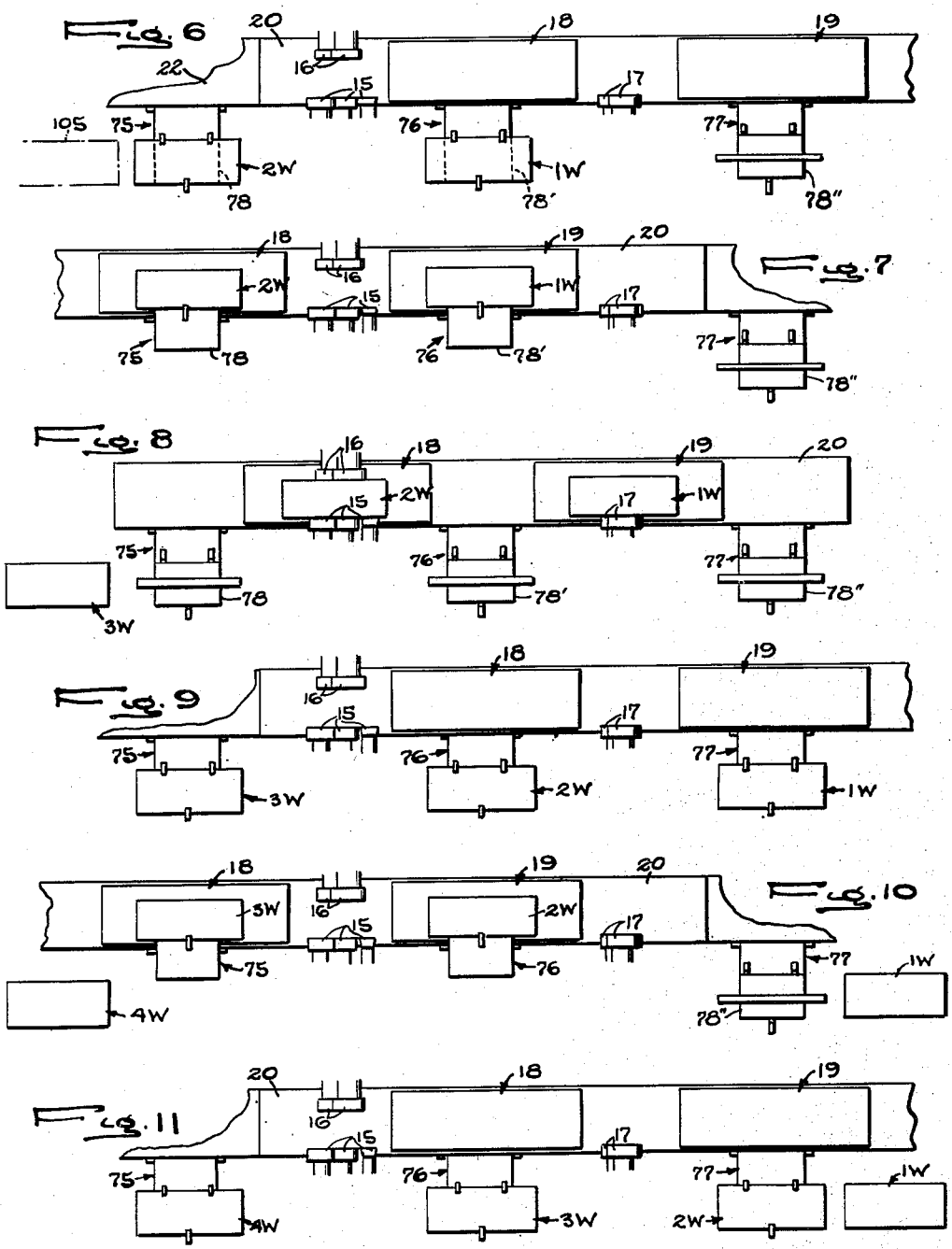

Patented Dec. 11, 1951

2,577,766

UNITED STATES PATENT OFFICE 2,577,766

MULTIPLE STATION MACHINE TOOL

Arthur W. Johnson and Elmer L. Fagerstrom, Rockford, Ill., assignors to The Ingersoll Milling Machine Company, Rockford, Ill., a corporation of Illinois Application December 7, 1949, Serial No. 131,638

4 Claims. (Cl. 90—21)

1

This invention relates to machine tool organizations of the automatic transfer type in which a row of workpieces spaced along a line of metal removing stations is advanced intermittently to carry each workpiece from one station to the next. The invention has more particular reference to multiple machines in which the advance of the workpieces is effected by the motion of an elongated reciprocable table to which the pieces are clamped while being fed past the respective metal removing tools and off from which the workpieces are shifted laterally out of their fixtures during retraction of the table.

The general object is to provide a machine tool organization of the above character which is more versatile than similar tools heretofore used, which is readily convertible for machining workpieces of different sizes, which occupies a minimum over-all length of floor space, and which provides for optimum rigidity of support for the workpieces when the latter are secured to the table.

Another object is to provide a machine tool organization of the above character in which a plurality of workpieces are transferred laterally and horizontally onto or off the table in advance of and beyond each of a plurality of metal removing tools and held out of the way of the table fixtures during return of the table.

A more detailed object is to achieve rigidity of the workpiece supports through the use of generally rectangular fixture frames spaced along and secured to the table top so as to clear the workpieces during retraction of the table after the workpieces have been transferred horizontally off from the table.

Another object is to associate with the swingable work transfer devices a novel mechanism for effecting final location of the workpieces in their fixtures.

Other objects and advantages of the invention will become apparent from the following detailed description taken in connection with the accompanying drawings, in which Figure 1 is a side elevational view of a machine tool organization embodying the novel features of the present invention.

Fig. 2 is a plan sectional view taken along the line 2—2 of Fig. 1.

Figs. 3 and 4 are fragmentary sectional views taken respectively along the lines 3—3 and 4—4 of Fig. 2.

Fig. 5 is a fragmentary sectional view taken along the line 5—5 of Fig. 2 with the parts of one work transferring device shown in a different position.

2

Figs. 6 through 11 are schematic views showing the progress of workpieces through the machine tool in two machine cycles.

For purposes of illustration, the invention is shown in the drawings incorporated in a multiple station machine for performing two separate milling operations on one surface 10 and one milling operation on the other side 11 of the work pieces W advanced successively through the machine. It will be understood that the invention is not limited to such metal removing operations nor to the specific structure of the various operating mechanisms, but is applicable to all modifications and alternative constructions and arrangements falling within the spirit and scope of the appended claims.

The workpieces shown by way of example are the cylinder block castings of internal combustion engines. Each has an outwardly projecting bottom flange 12 at its lower flat end and various bosses 13 and 14 through which the block may be supported rigidly in a fixture. In this instance, the bosses project from the side of the casting on which the latter is supported in the fixtures so as to expose the top and bottom surfaces 10 and 11 and dispose the same in vertical planes for engagement with sets of milling cutters 15, 16, and 17 by which the surfaces are machined.

The milling operations are performed simultaneously on two of the workpieces clamped in fixtures 18 and 19 which are secured to and spaced along the top of an elongated table 20 reciprocable back and forth between a retracted position shown in Figs. 1 and 2 and an advanced position shown in Figs. 6 and 9. The table is slidable along horizontal guideways 21 on an elongated bed 22, and the forward feed and rapid return motion are imparted to the table by any suitable power driven actuating mechanism which may be cycled automatically and which may include motors 23 acting through a suitable transmission to drive a screw 24 (Fig. 5) and an elongated half nut 25 on the underside of the table.

The three sets of cutters 15, 16, and 17 are fixed to spindles which are journaled in and project inwardly from upright columns 26 and driven through suitable gearing from a motor 27, the cutters of the respective sets being positioned axially so as to locate their cutting planes accurately and coincident with the work surfaces to be formed. The columns supporting the cutters 15 and 16 are rigid with and disposed on opposite sides of the bed 22 and located longitudinally of the latter so as to mill the opposite surfaces 10 and 11 on the workpiece in the fixture 18 as the table is advanced from its retracted position shown in Fig. 1. The supports for the cutters 17 are positioned for engagement with the workpiece in the fixture 19 in the same advancing movement of the table. When it is desirable to perform other operations on the workpiece, appropriately positioned cutters or groups thereof may be added and mounted on other columns spaced along the bed.

The frame of each fixture is in the form of a rigid rectangular casting upstanding from the table 20 along the longitudinal center line thereof and adapted to provide extremely sturdy support for the workpieces whose surfaces 10 and 11 are exposed on opposite sides of the rectangle. The latter comprises a base 28 keyed and bolted at 29 and 33 to the table top and spanning and bolted to the lower ends of the legs 30 of an inverted U-shaped member 31 which is fastened to the table by bolts 32. To provide additional lateral support for the fixture frame, the upper or closed end of the U, which is spaced above the workpiece in the fixture, is formed with an extension 34 (Fig. 5) projecting outwardly across the table and bolted to an elongated rail 35 which slides in a guideway 36 extending along the top of the cutter supporting columns 26 parallel to the table motion.

The fixtures 18 and 19 are adapted to receive the workpieces by movement of the latter generally horizontally and transversely in between the legs 30 of the frame 31 to a position in which the supporting bosses 13 and 14 of the workpiece are disposed close to or in contact with correspondingly positioned supporting buttons 37 and 38 on the fixture base 28. To adapt the fixture readily for use with workpieces of other sizes and shapes, the buttons are formed herein on blocks 39 and 40 keyed and bolted detachably in the proper locations on the top of the fixture base 28. Additional center support for the workpiece may be provided by a plunger 41 (Fig. 3) upstanding from the base 28 and adapted to be projected upwardly into engagement with a boss 42 on the underside of the workpiece. Such upward movement is effected by a wedge 43 on the inner end of a rod 44 which is shifted in the wedging direction by a spring and retracted admitting pressure fluid to one end of a hydraulic actuator 44'.

Location of the workpieces transversely of the table is effected by pushing the piece against stops 45 which face horizontally and are positioned to engage the lower flange 12 of the workpiece near opposite ends of the latter. Herein the stops 45 comprise the outer ends of rods 46 urged outwardly by springs 47 and shouldered for abutment with adjustable plugs 48 which are threaded into the fixture base and determine the final position of the stops. When the workpiece is held against two such stops, twisting of the piece horizontally is prevented. Endwise location of the workpiece in its fixture is effected by a stop 49 (Fig. 3) which is mounted on one of the upright legs 30 of the fixture frame and engages one end 50 of the workpiece and faces in the direction of forward feed of the table so that the end thrust imposed on the workpiece by the action of the cutters is transmitted to the rigid rectangular frame of the fixture. Herein the stop 49 comprises a removable preferably rounded head on a screw threaded into the end of a rod 51 which is slidable in one leg 30 of the fixture frame and is limited in its outward movement by engagement of a shoulder 52 on the rod with the end of a screw plug 53 which is adjustable to vary the limit position of the stop.

After being deposited in the fixture, the workpiece is shifted endwise against the stop 49 by a plunger 54 slidable horizontally of the table in the other leg 30 of the fixture frame and having a rounded replaceable end 55 alined with the stop 49 and positioned to engage the leading end 56 of the workpiece. Projection of the plunger 54 forwardly to shift the workpiece occurs when pressure fluid is admitted behind the piston 57 of a hydraulic actuator 58. Admission of pressure fluid to the rod end of the actuator cylinder results in retraction of the plunger 54.

The upper cross-member of the rigid fixture frame provides a support for two pairs of shoes 59 and 60 which are pressed downwardly with sufficient force to clamp the workpiece against the supporting buttons 37 and 38 after lateral and endwise positioning of the piece against the stops 45 and 49. The shoes of each pair are pivoted on the lower ends of plungers 61 and 62 guided for vertical movement in the cross-member 31 and carrying rack teeth which mesh respectively with pinions 63 and 64. The two pinions 63 mesh with the teeth of rack bars 65 which are slidable in the frame member 31 and are moved back and forth by hydraulic actuators 66 including a piston 67 on each bar. When pressure fluid is admitted to the head end of the pistons, the bars 65 are moved toward each other to press the clamping shoes 59 downwardly against the workpiece as shown in Fig. 3. Admission of pressure fluid to the other or rod ends of the pistons 67 results in outward movement of the bars 65 and release of the clamps 59.

In a similar way, the two pinions 64 mesh with teeth on rack bars 68 carrying the pistons 69 of hydraulic actuators 70. Thus, the clamping shoes 60 are pressed against the workpiece as shown in Figs. 3 and 5 when pressure fluid is admitted to the head ends of the pistons 69, the clamps being released when the pressure is applied to the rod ends of the pistons.

The shape of the shoes 59 and 60 corresponds to the contour of the workpiece surface engaged thereby. After full engagement of the shoes 60, each of the latter is locked positively by a wedge 71 projected across the inclined upper end of the rod 62 by the admission of pressure fluid behind the piston 72 of an actuator 73.

By mounting the four clamps and their power actuators on the upper cross-member 31 of the fixture frame, clamping forces of large magnitude may be produced and distributed properly over the workpiece so as to hold all parts of the latter against the fixture base with the firmness required to withstand the strains incident to the metal removing operations. At the same time, all of the moving parts are disposed along the center of the work table thereby providing optimum lateral compactness of the work fixture. In addition, the forces incident to the milling operations are sustained primarily by the stops 49 which are rigid with the heavy fixture frame after the workpiece has been located in the manner described above.

The sturdy construction of work fixtures above described is made possible by providing for transfer of the workpieces into and out of the fixtures in directions transversely of the work table and its path of reciprocation. Such movement of the workpieces is effected by three transfer or loading devices 75, 76, and 77.

In accordance with the present invention, provision is made for transferring the workpieces into and out of the fixtures by movements transversely of the table and more particularly by movement of the pieces along an arcuate path during which the pieces are turned through a quarter revolution. In the two station machine tools shown, such transfer is effected by three devices 75, 76, and 77 disposed along one side of the machine bed 22 and spaced apart distances equal to the stroke of the table. In general, the devices comprise platforms 78, 78', and 78" each swingable about a fixed axis adjacent the edge of the table. Each platform comprises a generally rectangular block having upstanding side rails 79 rotatably supporting opposite ends of a series of rollers 80 spaced along the platform longitudinally of the work table. A guide rail 81 is supported by end brackets above the level of the rollers 80 to enter the bottom recess 81' in the workpieces and thus center the latter on the platform.

Projecting horizontally from the inner edge of the platform are arms 82 pivoted adjacent the edge of the table on a shaft 83 which is supported in brackets 84 (Figs. 4 and 5) secured to the side of the machine bed 22. The shaft is located so that a workpiece centered on the platform as shown in full in Fig. 4 will, in swinging of the platform upwardly into a vertical plane as shown in phantom in Fig. 4, move the workpiece in an arcuate path tipping the piece onto its side and transferring the piece into the open side of the fixture, the bosses 13 and 14 on the workpiece being brought into positions immediately above and close to or in contact with the supporting buttons 37 and 38 on the fixture base.

Such raising of the platform is effected by a power actuator 85 including herein a cylinder 86 pivoted at 87 between outwardly projecting lugs 88 on the side of the bed 22. The rod of a piston 89 slidable in the cylinder 86 projects upwardly and is pivotally connected to a rockshaft 90 journaled on the platform 78 along and below the inner edge thereof. The platform is raised when pressure fluid is admitted to the lower end of the cylinder 86 whose closed upper end forms a stop for arresting the swinging of the platform when the workpiece reaches the position shown in phantom in Fig. 4.

While the workpiece is being swung into and out of the fixture, it is clamped firmly against the platform rollers 80 by three jaws 91 and 92 projecting upwardly and around the edges of the platform and formed on the ends of bell cranks 93, two of which are fast on the rockshaft 90 and the other of which is on a rockshaft 94 extending along and disposed below the outer edge of the platform 78. The other arms of the bell cranks project inwardly beneath the platform and have pin and slot pivotal connections at their ends with a head 95 on the upper end of the rod of a piston 96 which slides vertically in a cylinder 97 on the platform, the piston and cylinder forming a hydraulic actuator 98. When the head 95 is moved upwardly by the admission of pressure fluid below the piston 96, the bell cranks are rocked to move the jaws 91 and 92 outwardly as shown in Fig. 5 thereby permitting a workpiece to be slid endwise onto or off from the platform. Lowering of the plunger to the position shown in Fig. 4, swings the jaws inwardly and toward each other to bring the upwardly and inwardly inclined under surfaces of the jaw ends into overlying relation and engagement with the bottom flanges 12 of the workpiece. The latter is thus centered accurately on the platform and then clamped rigidly against the rollers 80.

The transfer devices 75 and 76 which are used for loading workpieces into the fixtures on the table are preferably equipped with power actuated means for effecting the final shifting of the pieces transversely of the table and against the stops 45. For this purpose, two pushers in the form of rolls 100 (Fig. 5) are disposed adjacent the rollers 80 at opposite ends of the platform 75 or 75' so as to be adapted for engagement with the bottom surface of the workpiece flange 12 nearest the table. These pushers are on the ends of rods 101 slidable in the platform and carrying pistons 102 which cooperate with cylinders 103 on the platform to form actuators 104. When pressure fluid is admitted against the head end of the pistons 102 after the workpiece has been transferred into the fixture and the clamping jaws released as shown in Fig. 5, the pusher elements 100 will be projected forwardly sliding the workpiece then resting on the buttons 37 and 38 transversely of the table until the stop pins 45 come against the shoulders 48.

The mechanism including the pushers 101 and the associated actuators for positioning a workpiece after deposition thereof in the fixture forms the subject matter of an application Serial No. 133,630, filed Dec. 17, 1949, by John M. Strachan, and no claim to such subject matter is made herein.

The transfer device 75 is utilized only to load workpieces into the empty fixture 18 when the table is retracted and is adapted to receive successive workpieces from a roller conveyor 105 positioned at the level of the platform 78. The workpieces are slid endwise one by one off from the conveyor 105 onto the platform 78 of the transfer device, being located properly when the leading end of the piece comes against a stop 106 upstanding from the platform.

The transfer device 76 performs the dual function of removing partially machined workpieces from the fixtures 18 when the table is in its advanced position, holding these workpieces to one side of and clear of the fixture while the table is being retracted, and then transferring the workpieces back onto the table into the fixture 19. Like the loading device 75, this transfer device is equipped with the pushers 100 which operate, after the workpieces have been deposited in the fixtures, to shift the pieces across the buttons 37 and 38 and against the locating abutments 45.

The last transfer device 76 in the row is utilized only to unload the finished workpiece from its fixture 19 on the table. No locating pushers 100 are required on this device.

*Operation*

The various hydraulic actuators above described and the operator for reciprocating the table back and forth are controlled in the usual way by electromagnetic valves, switches, and relays (not shown) so as to operate in an automatic cycle which may if desired be initiated under manual control. Various interlocks controlled by the movable parts, including the table 20, the jaws 91, 92, the platforms 78, 78', and 78", the stops 45 and 49, and the clamps 59 and 60 are of course provided to insure energization of the various power actuators in the desired sequence. The complete cycle is as follows assuming that the work table 20 is in its advanced position as shown in Fig. 6 with one workpiece 1 partially milled by the cutters 15 and 16 removed from the fixture 18 and supported on and clamped to the platform 78' of the transfer device 76. The next workpiece 2 to be operated on may be supported on and clamped to the platform 78 of the transfer device 75. The workpieces 1 and 2 are thus disposed alongside the table opposite the fixtures 18 and 19 and clear of the latter.

In the next step of the cycle, the table is rapidly returned to its retracted position bringing the fixtures 18 and 19 opposite the transfer devices 75 and 76 and the workpieces 1 and 2 clamped thereto. The actuators 85 for the platforms 78 and 78' are then energized to swing those platforms upwardly and carry the workpieces into the fixtures 18 and 19 (Fig. 7) where they are deposited by energization of the actuators 98 to retract the jaws. The workpieces now resting on the buttons 37 and 38 are shifted laterally against the stops 45 by energization of the pusher actuators 104 and then endwise against the stops 49 by the actuators 58. Clamping of the workpieces is then effected in response to energization of the actuators 69, 70, and 73 after which the platforms may, by reverse energization of the actuators 85, be swung outwardly and downwardly clear of the table and the fixtures thereon as shown in Fig. 8.

The table may now be rapidly advanced to approach the workpieces 1 and 2 to the cutters 17 and 15 after which the advance is continued at a feed rate suitable for milling the two exposed surfaces 10 and 11 of the workpiece 2 and the surface 10 of the workpiece 1 as shown in Fig. 8. After the workpieces have passed the cutters, the advancing stroke of the table may be completed at a rapid rate bringing the workpieces 2 and 1 opposite the transfer devices 76 and 77. Next the workpieces are unclamped and the actuators 85 of the transfer devices 76 and 77 are energized to swing the platforms 78' and 78" upwardly into the fixtures 18 and 19, the platforms being coupled to the workpieces 2 and 1 respectively by energizing the actuators 98 which swing the jaws 91 and 92 together around the flanges 12 of the two workpieces. Then, by reversing the energization of the actuators 85, the workpieces will be withdrawn from the fixtures and brought into an upright position clear of the table as shown in Fig. 9.

The table may be rapidly returned to its retracted position as shown in Fig. 10. By this time, the next workpiece 3 will have been slid off from the conveyor and onto the platform 78 against the stop 106 and thus disposed in loading position. After this workpiece has been clamped to the platform 78, the actuators 85 of the transfer devices 75 and 76 are energized to swing the platforms 78 and 78' upwardly delivering the workpieces thereon into the fixtures 18 and 19 respectively (see Fig. 10) where they are deposited by release of the jaws 91 and 92 as described above. The platform 78" of the transfer device 77 remains in horizontal position, and the finished workpiece 1 thereon may be moved off endwise onto a suitable conveyor after the jaws 91 and 92 have been retracted. After the workpieces 3 and 2 have been located laterally and longitudinally and clamped in the fixtures, the platforms 78 and 78" may be retracted and lowered out of the way of the fixtures so that the table may again be advanced to feed the workpieces 3 and 2 past the cutters 75 16 and 17 and to positions opposite the platforms 78' and 78" (Fig. 11). After release of the clamps 69 and 66, the platforms 78 and 78" are swung upwardly, coupled to the released workpieces 3 and 2 in the fixtures, and then retracted to remove the workpieces preparatory to rapid return of the table. In the meantime, the next workpiece 4 to be machined will have been moved onto and clamped to the platform 78.

It will be observed from the foregoing that in each cycle of the machine tool as described above, each workpiece is advanced from one fixture 18 to the next, the longitudinal transfer of all of the workpieces being effected by the forward motion of the table itself. This action combined with the rugged construction of the fixture frames as above described is made possible by transferring the workpieces laterally of the table out of the fixtures and holding the pieces out of the way during the idle retraction of the table to bring each workpiece opposite the fixture next farther advanced along the table. By virtue of such sidewise removal of the workpieces, the table may be of minimum length for a given number of metal removing stations and at the same time the clamps and their actuating mechanisms may be mounted advantageously on the cross-member 31 which spans the end walls of the fixture frame and imparts the desired rigidity to the latter.

We claim as our invention:

1. A machine tool organization having, in combination, an elongated table mounted for horizontal endwise reciprocation between advanced and retracted positions, at least two U-shaped frames rigidly secured to and upstanding from the top of said table in inverted positions and spaced apart along the table a distance corresponding to the stroke of the table, work fixtures one secured to said table between the depending legs of each of said frames and opening laterally of the table to receive a workpiece by movement thereof generally horizontally into and out of the path of travel of said frames, clamping shoes mounted on the closed end portions of said U-shaped frames and engageable with the tops of the workpieces therein, power actuators on said frames for projecting said shoes downwardly against the workpieces, cutters spaced along said table and acting during the advance of said table to machine the exposed faces of the workpieces in the respective fixtures, abutments formed on said fixtures for engaging the workpieces in said fixtures and transmitting the cutter thrust to the legs of said frames, at least three transfer devices spaced apart along the table distances equal to the spacing of said fixtures and the table stroke whereby each fixture is disposed opposite one of said devices in said retracted position of the table and opposite the succeeding transfer device when the table is in said advanced position, each of said devices including a platform swingable transversely of the table between a horizontal work-receiving position alongside the table and an upright position adjacent the side opening in one of said fixtures, means on each of said platforms for connecting a workpiece detachably thereto, and individual power actuated mechanisms for swinging said transfer devices between said horizontal and upright positions to insert the workpieces thereon into said fixtures or to remove workpieces from the fixture.

2. A machine tool organization having, in combination, an elongated table mounted for horizontal endwise reciprocation between advanced and retracted positions, at least two U-shaped frames rigidly secured to and upstanding from the top of said table in inverted positions and spaced apart along the table a distance corresponding to the stroke of the table, work fixtures one secured to said table between the depending legs of each of said frames and opening laterally of the table to receive a workpiece by movement thereof generally horizontally into and out of the path of travel of said frames, clamping shoes mounted on the closed end portions of said U-shaped frames and engageable with the tops of the workpieces therein, power actuators on said frames for projecting said shoes downwardly against the workpieces, cutters spaced along said table and acting during the advance of said table to machine the exposed faces of the workpieces in the respective fixtures, abutments formed on said fixtures for engaging the workpieces in said fixtures and transmitting the cutter thrust to the legs of said frames, at least three transfer devices spaced apart along the table distances equal to the spacing of said fixtures and the table stroke whereby each fixture is disposed opposite one of said devices in said retracted position of the table and opposite the succeeding transfer device when the table is in said advanced position, each of said devices including a member detachably connectable to a workpiece in one of said fixtures and mounted for movement transversely of the table to carry the connected workpiece into or out of the fixture, and power actuated mechanism for moving said member into and out of said fixtures and connecting the same to or disconnecting the members from the workpieces in the fixtures.

3. A machine tool organization having, in combination, an elongated table mounted for horizontal endwise reciprocation between advanced and retracted positions, at least two U-shaped frames rigidly secured to and upstanding from the top of said table in inverted positions and spaced apart along the table a distance corresponding to the stroke of the table, work fixtures one secured to said table between the depending legs of each of said frames and opening laterally of the table to receive a workpiece by movement thereof generally horizontally into and out of the path of travel of said frames, cutters spaced along said table and acting during the advance of said table to machine the exposed faces of both of the workpieces in said fixtures, abutments formed on said fixtures for engaging the workpieces in said fixtures and transmitting the cutter thrust to the legs of said frames, at least three transfer devices spaced apart along the table distances equal to the spacing of said fixtures and the table stroke whereby each fixture is disposed opposite one of said devices in said retracted position of the table and opposite the succeeding transfer device when the table is in said advanced position, each of said devices including a platform swingable transversely of the table between a horizontal work-receiving position alongside said table and an upright position adjacent the side opening in one of said fixtures, means on said platform for connecting a workpiece detachably thereto, and power actuated mechanism for swinging said transfer devices between said positions to insert the workpieces thereon into said fixtures or to remove workpieces from the fixture.

4. A machine tool organization having, in combination, an elongated table mounted for horizontal endwise reciprocation between advanced and retracted positions, at least two fixtures rigidly secured to the top of said table and spaced apart along the table distances corresponding to the stroke of the table and opening laterally of the table so as to receive a workpiece by movement thereof generally horizontally into and out of the path of travel of said fixtures, cutters spaced along said table and acting during the advance of said table to machine the exposed faces of the workpieces in the respective fixtures, abutments formed on said fixtures for engaging the workpieces in said fixtures and transmitting the cutter thrust to the legs of said frames, at least three transfer devices spaced apart along the table distances equal to the spacing of said fixtures and the table stroke whereby each fixture is disposed opposite one of said devices in said retracted position of the table and opposite the succeeding transfer device when the table is in said advanced position, each of said devices including a platform swingable transversely of the table between a horizontal work-receiving position alongside said table, and an upright position adjacent the side opening in one of said fixtures, means on said platform for connecting a workpiece detachably thereto, and power actuated mechanisms for swinging said transfer devices individually between said positions to insert the workpieces thereon into said fixtures or to remove workpieces from the fixture.

ARTHUR W. JOHNSON.
ELMER L. FAGERSTROM.

REFERENCES CITED

The following references are of record in the file of this patent:

UNITED STATES PATENTS

| Number | Name | Date |
| --- | --- | --- |
| 1,218,044 | Beaman | Mar. 6, 1917 |
| 2,108,823 | Lyon | Feb. 22, 1938 |
| 2,142,735 | Rougemont | Jan. 3, 1939 |
| 2,235,832 | Freeman | Mar. 25, 1941 |
| 2,326,847 | Fanning | Aug. 17, 1943 |
| 2,462,235 | Swenton | Feb. 22, 1949 |